United States Patent
Komatsu

(10) Patent No.: US 10,143,889 B2
(45) Date of Patent: Dec. 4, 2018

(54) POSITIONING SYSTEM AND POSITIONING METHOD

(71) Applicant: BRIDGESTONE SPORTS CO., LTD., Tokyo (JP)

(72) Inventor: Atsushi Komatsu, Saitama (JP)

(73) Assignee: BRIDGESTONE SPORTS CO., LTD., Tokyo (JP)

(*) Notice: Subject to any disclaimer, the term of this patent is extended or adjusted under 35 U.S.C. 154(b) by 0 days.

(21) Appl. No.: 15/600,945

(22) Filed: May 22, 2017

(65) Prior Publication Data
US 2017/0368411 A1 Dec. 28, 2017

(30) Foreign Application Priority Data
Jun. 28, 2016 (JP) ................... 2016-128206

(51) Int. Cl.
| | |
|---|---|
| A63B 24/00 | (2006.01) |
| A63B 57/30 | (2015.01) |
| A63B 37/00 | (2006.01) |
| A63B 43/00 | (2006.01) |
| A63B 71/06 | (2006.01) |
| G01S 19/19 | (2010.01) |
| G01S 5/14 | (2006.01) |
| G01S 19/51 | (2010.01) |
| G01S 11/06 | (2006.01) |

(52) U.S. Cl.
CPC ...... *A63B 24/0021* (2013.01); *A63B 37/0072* (2013.01); *A63B 43/00* (2013.01); *A63B 43/008* (2013.01); *A63B 57/353* (2015.10); *A63B 71/0619* (2013.01); *G01S 5/14* (2013.01); *G01S 11/06* (2013.01); *G01S 19/19* (2013.01); *G01S 19/51* (2013.01); *A63B 2024/0053* (2013.01); *A63B 2225/50* (2013.01)

(58) Field of Classification Search
None
See application file for complete search history.

(56) References Cited

U.S. PATENT DOCUMENTS

| | | | | |
|---|---|---|---|---|
| 6,996,403 B2* | 2/2006 | Shi | ........................ | G01S 5/0289 455/41.2 |
| 2002/0098913 A1* | 7/2002 | Goldman | ........... | A63B 24/0021 473/353 |
| 2005/0020279 A1* | 1/2005 | Markhovsky | ......... | G01S 5/0294 455/456.1 |

(Continued)

FOREIGN PATENT DOCUMENTS

| | | |
|---|---|---|
| JP | H06-210041 | 8/1994 |
| JP | H11-267248 | 10/1999 |

(Continued)

*Primary Examiner* — Kevin Y Kim
(74) *Attorney, Agent, or Firm* — IPUSA, PLLC

(57) ABSTRACT

A positioning system includes a golf ball and a mobile terminal. The golf ball includes a battery and a transmitter configured to operate with electric power supplied from the battery and transmit a radio signal to outside of the golf ball. The mobile terminal includes a receiver configured to receive the radio signal from the golf ball and a processor configured to measure the position of the mobile terminal, and to measure the position of the golf ball based on the strength of the radio signal received by the receiver at two or more points at which the measured position of the mobile terminal differs.

8 Claims, 12 Drawing Sheets

(56) References Cited

U.S. PATENT DOCUMENTS

2005/0259002 A1   11/2005  Erario et al.
2015/0094167 A1*   4/2015  Zimmerman .......... G01S 19/19
                                                                    473/353

FOREIGN PATENT DOCUMENTS

| JP | 2000-005366 | 1/2000 |
| JP | 2004-065346 | 3/2004 |
| JP | 2007-538255 | 12/2007 |
| JP | 2015-159932 | 9/2015 |

* cited by examiner

POSITIONING SYSTEM AND POSITIONING METHOD

CROSS-REFERENCE TO RELATED APPLICATION

This application is based upon and claims priority to Japanese Patent Application No. 2016-128206, filed on Jun. 28, 2016, the entire contents of which are incorporated herein by reference.

BACKGROUND OF THE INVENTION

1. Field of the Invention

The present invention relates to positioning systems and positioning methods that determine the position of a golf ball.

2. Description of the Related Art

A golf ball tracking system using a golf ball that includes a receiver configured to receive global positioning system (GPS) signals and a transmitter configured to transmit location information obtained from the GPS signals received by the receiver to outside of the golf ball is known. (See, for example, Japanese National Publication of International Patent Application No. 2007-538255 ("Patent Document 1").)

Furthermore, a flight distance measuring system that uses a golf ball capable of transmitting and receiving a radio signal and measuring the flight distance of the golf ball based on the strength of a signal transmitted from the golf ball or the strength of a signal received from an external transmitter by the golf ball is known. (See, for example, Japanese Laid-Open Patent Application No. 2015-159932 ("Patent Document 2").)

SUMMARY OF THE INVENTION

According to an aspect of the present invention, a positioning system includes a golf ball and a mobile terminal. The golf ball includes a battery and a transmitter configured to operate with electric power supplied from the battery and transmit a radio signal to outside of the golf ball. The mobile terminal includes a receiver configured to receive the radio signal from the golf ball and a processor configured to measure the position of the mobile terminal, and to measure the position of the golf ball based on the strength of the radio signal received by the receiver at two or more points at which the measured position of the mobile terminal differs.

The object and advantages of the embodiments will be realized and attained by means of the elements and combinations particularly pointed out in the claims.

It is to be understood that both the foregoing general description and the following detailed description are exemplary and explanatory and not restrictive of the invention.

DETAILED DESCRIPTION OF THE PREFERRED EMBODIMENTS

The technique disclosed in Patent Document 1, however, requires an expensive GPS receiver to be incorporated in a golf ball is subject to a relatively high chance of getting lost during play, and is therefore not practical in terms of cost.

Furthermore, with the technique disclosed in Patent Document 2, it is possible to measure the flight distance of a golf ball, but it is not possible to locate the golf ball.

According to an aspect of the present invention, a positioning system and method capable of locating a golf ball with a relatively inexpensive arrangement are provided.

Embodiments of the present invention, which are non-limiting examples, are described below with reference to the accompanying drawings.

First Embodiment

Figure 1A:
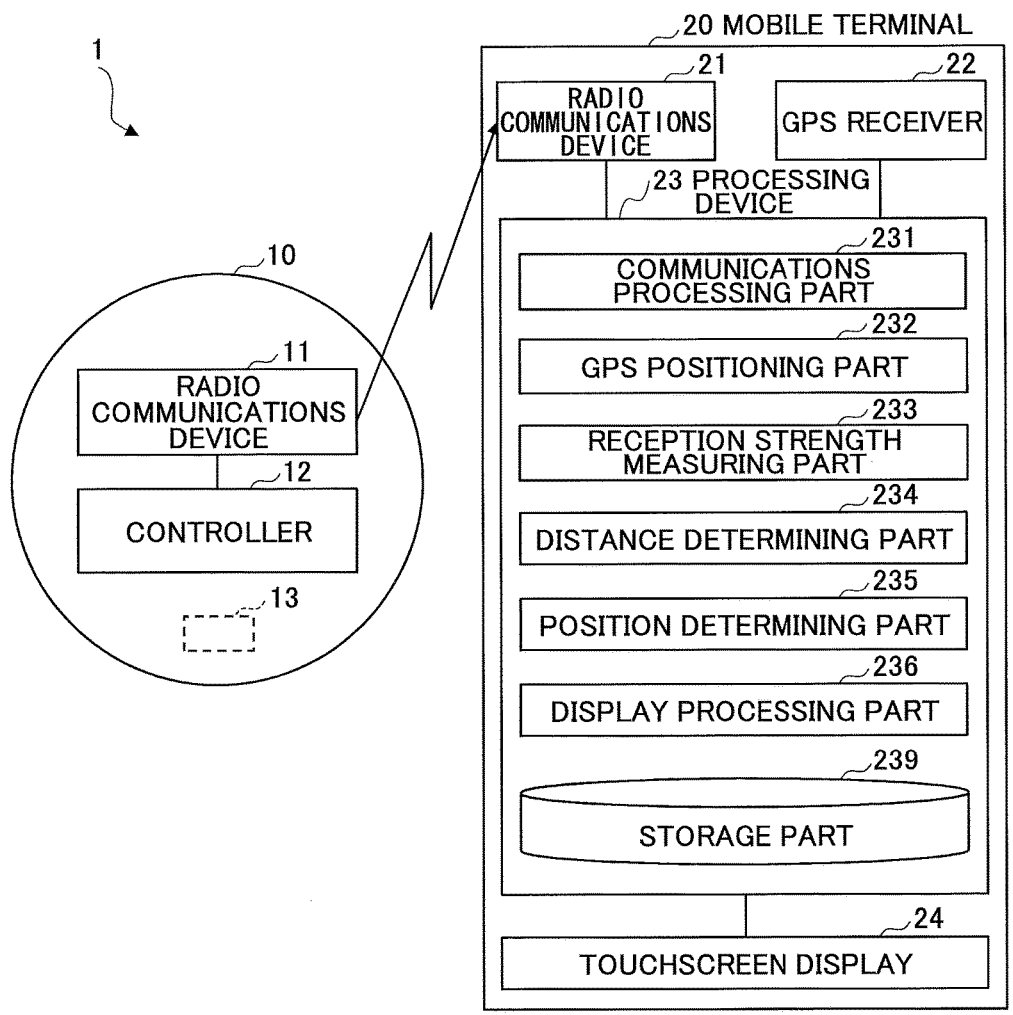
FIG. 1A is a block diagram depicting a schematic arrangement of a positioning system according to a first embodiment.

FIG. 1A is a schematic block diagram depicting an arrangement of a positioning system 1 according to a first embodiment.

The positioning system 1 includes a golf ball 10 and a mobile terminal 20. A below-described processing device 23 in the mobile terminal 20 (an example of a built-in computer of the mobile terminal 20) executes various processes to determine the position of the golf ball 10.

The golf ball 10 includes a radio communications device 11, a controller 12, and a battery 13.

An impact reducing structure (for example, an impact absorbing member) for reducing an impact on the radio communications device 11, the controller 12, and the battery 13 caused by hitting the golf ball 10 with a golf club by a user may be applied to the golf ball 10.

The radio communications device 11 (an example of a first transmitter) is a communications device configured to transmit a radio signal to outside of the golf ball 10. The radio communications device 11 may be, for example, a Bluetooth (registered trademark) communications module compliant with Bluetooth, which is a radio communications standard. In the following description, it is assumed that the radio communications device 11 is a Bluetooth communications module.

A radio signal transmitted from the radio communications device 11 is desirably specified to travel at least a certain distance (for example, approximately a few meters to approximately several tens of meters). Therefore, for example, when the radio communications device 11 is a Bluetooth communications module, the radio communications device 11 may be compliant with Class 1 (having a range of up to approximately 100 m) or Class 2 (having a range of up to approximately 10 m). Furthermore, the radio communications device 11 is not limited to the Bluetooth communications module, and any radio communications standard may be selected as the radio communications standard employed in the radio communications device 11.

The controller 12 controls the operation of the radio communications device 11. The controller 12, for example, periodically transmits a radio signal having a prescribed strength to outside of the golf ball 10 through the radio communications device 11.

Functions of the controller 12 may be implemented by hardware such as an electronic circuit or software executed by a central processing unit (CPU). Furthermore, the controller 12 may be implemented together with the radio communications device 11 as an integrated circuit (IC) chip.

The battery 13 is a power supply that supplies electric power to the radio communications device 11 and the controller 12 (for example, an IC chip in which the radio communications device 11 and the controller 12 are implemented). For example, the golf ball 10 may include a built-in power receiving part (not depicted) and charge the battery 13 with electric power supplied wirelessly from an external power transmitting part to the power receiving part using a known wireless charging system (such as inductive charging, resonance charging, or radio charging).

The radio communications device 11 and the controller 12 may enter power-saving mode (sleep mode) except for, for example, a period of transmission of a radio signal to outside of the golf ball 10. This makes it possible to reduce consumption of the power of the battery 13.

The mobile terminal 20 is a portable terminal, such as a cellular phone, a smartphone, or a tablet terminal, carried by a user. The mobile terminal 20 includes a radio communications device 21, a GPS receiver 22, the processing device 23, and a touchscreen display (hereinafter, simply referred to as "display") 24.

The mobile terminal 20 does not have to be a general-purpose terminal such as a cellular phone, a smartphone, or a tablet terminal, and may be a terminal dedicated to the function of determining the position of the golf ball 10.

The radio communications device 21 (an example of a receiver) receives a radio signal transmitted from the golf ball 10 (the radio communications device 11) according to the same radio communications standard as the radio communications device 11 (namely, by Bluetooth communications). The radio communications device 11 and the radio communications device 21 are paired (connected) in advance to be able to transmit and receive radio signals between each other. In the following description, it is assumed that the radio communications device 11 and the radio communications device 21 are already paired.

When the radio communications device 21 is, for example, a Bluetooth communications module, the radio communications device 21 is compliant with Class 1 or Class 2 the same as the radio communications device 11. Furthermore, the radio communications device 21 is not limited to the Bluetooth communications module, and any radio communications standard may be selected as the radio communications standard employed in the radio communications device 21 as long as the radio communications standard is the same as that of the radio communications device 11.

The GPS receiver 22 receives GPS signals transmitted from GPS satellites orbiting the Earth.

Figure 1B:
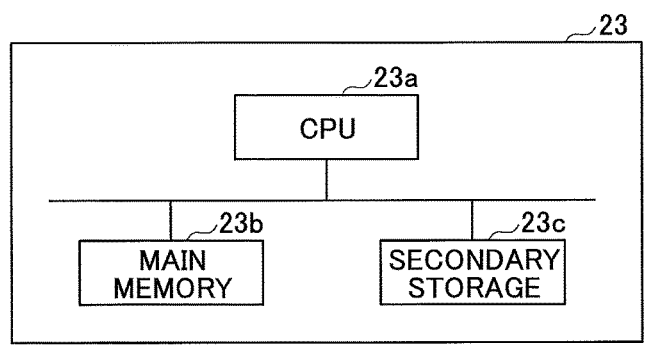
FIG. 1B is a block diagram depicting a schematic hardware arrangement of a processing device of a mobile terminal according to an embodiment.

FIG. 1B is a schematic block diagram depicting a hardware arrangement of the processing device 23. The processing device 23 includes, for example, a CPU 23a, a main memory 23b such as a read-only memory (ROM) and a random access memory (RAM), and a secondary storage 23c. Referring to FIG. 1A, the processing device 23 includes a communications processing part 231, a GPS positioning part 232, a reception strength measuring part 233, a distance determining part 234, a position determining part 235, and a display processing part 236, which are implemented by the CPU 23a executing one or more programs stored in the main memory 23b. The processing device 23 further includes a storage part 239 implemented as a storage area defined by, for example, the main memory 23b.

The communications processing part 231 controls communications with the golf ball 10, using the radio communications device 21. For example, the communications processing part 231 receives a radio signal transmitted from (the radio communications device 11 of) the golf ball 10.

The GPS positioning part 232 measures (determines) the position of the mobile terminal 20 based on GPS signals received by the GPS receiver 22, using a known GPS positioning method.

The reception strength measuring part 233 measures the strength (reception strength) of a radio signal received from the golf ball 10 by the communications processing part 231.

The distance determining part 234 determines the distance from the mobile terminal 20 to the golf ball 10 based on the reception strength of a radio signal from the golf ball 10 measured by the reception strength measuring part 233. A radio signal transmitted from the golf ball 10 (specifically, the radio communications device 11) to outside of the golf ball 10 attenuates as the distance from the golf ball 10 increases. Therefore, the distance determining part 234 can determine (estimate) the distance from the mobile terminal 20 to the golf ball 10 based on the level of the reception strength of a radio signal from the golf ball 10 received by the communications processing part 231. For example, the distance determining part 234 may calculate the distance from the mobile terminal 20 to the golf ball 10 using a map representing a predetermined relationship between the reception strength and the distance or a formula for calculating the distance from the reception strength.

The position determining part 235 locates the golf ball 10, namely, determines the position of the golf ball 10, based on the position of the mobile terminal 20 determined by the GPS positioning part 232 and the distance from the mobile terminal 20 to the golf ball 10 determined by the distance determining part 234. A specific technique of locating the golf ball 10 by the position determining part 235 is described in detail below.

The display processing part 236 generates a screen to be displayed on the display 24 and displays the generated screen on the display 24.

According to this embodiment, the functions of the reception strength measuring part 233, the distance determining part 234, and the position determining part 235 are, for example, called by an application program (hereinafter referred to as "ball search application") that runs on the operating system (OS) of the mobile terminal 20 or incorporated into the ball search application. The ball search application is activated on the OS to display a predetermined graphical user interface (GUI) on the display 24 through the display processing part 236. For example, a user can execute some or all of the functions of the reception strength measuring part 233, the distance determining part 234, and the position determining part 235 by performing various operations on the GUI.

Alternatively, some or all of the functions of the reception strength measuring part 233, the distance determining part 234, and the position determining part 235 may be executed in accordance with predefined conditions independent of a user's operations.

Next, a technique of locating the golf ball 10 by the positioning system 1 (the position determining part 235) according to this embodiment is described with reference to FIG. 2.

Figure 2:
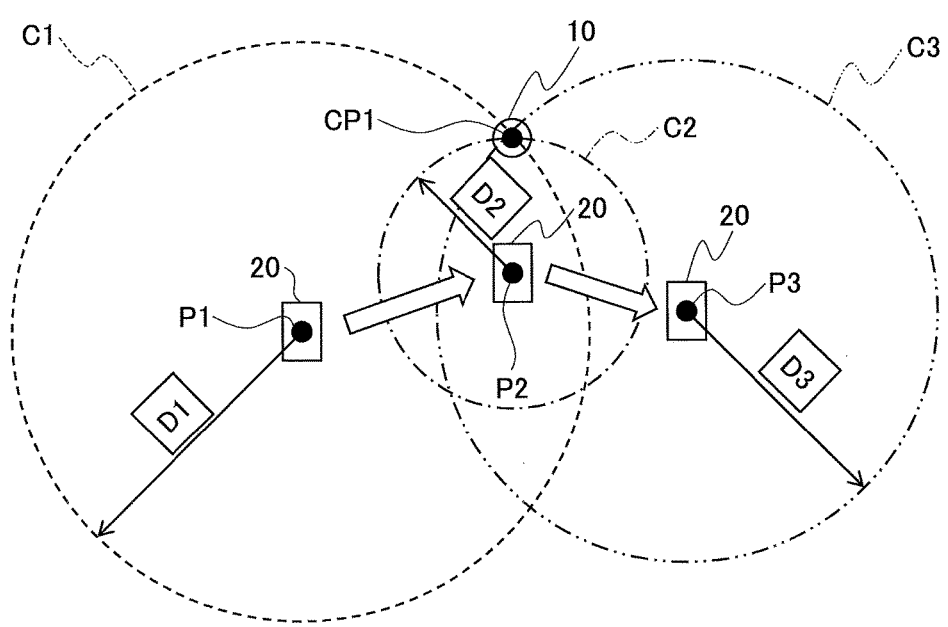
FIG. 2 is a diagram illustrating a technique of locating a golf ball by the positioning system according to the first embodiment.

FIG. 2 is a diagram illustrating a technique of locating the golf ball 10 by the positioning system 1 (the position determining part 235). In the following description, it is assumed that a user moves from Point P1 to Point P2 to Point P3 to search for the golf ball 10.

Referring to FIG. 2, the distance from the mobile terminal 20 to the golf ball 10 determined by the distance determining part 234 at Point P1 is a value D1. Therefore, the position determining part 235 can presume that the golf ball 10 is on a circle (hereinafter referred to as "distance circle") C1 having a center at Point P1 (namely, the position of the mobile terminal 20 measured by the GPS positioning part 232 at Point P1) and a radius of the value D1.

The user moves to Point P2 different from Point P1, and the distance from the mobile terminal 20 to the golf ball 10 determined by the distance determining part 234 at Point P2 is a value D2. Therefore, the position determining part 235 can presume that the golf ball 10 is on a distance circle C2 having a center at Point P2 (namely, the position of the mobile terminal 20 measured by the GPS positioning part 232 at Point P2) and a radius of the value D2.

The user further moves to Point P3 different from Points P1 and P2, and the distance from the mobile terminal 20 to the golf ball 10 determined by the distance determining part 234 at Point P3 is a value D3. Therefore, the position determining part 235 can presume that the golf ball 10 is on a distance circle C3 having a center at Point P3 (namely, the position of the mobile terminal 20 measured by the GPS positioning part 232 at Point P3) and a radius of the value D3.

Accordingly, the position determining part 235 can determine Intersection Point CP1 of the three distance circles C1 through C3 as the position of the golf ball 10.

Depending on the accuracy of the GPS positioning part 232 and the distance determining part 234, the intersection point of the three distance circles C1 through C3 may not be found. In this case, first, a distance circle that serves as a reference ("reference distance circle") is determined. For example, the distance circle C1 is determined as a reference distance circle. Then, from among the combinations of each intersection point extracted from the (normally two) intersection points of the distance circles C1 and C2 and each intersection point extracted from the (normally two) intersection points of the distance circles C1 and C3, a combination of the intersection points whose distance is the shortest is selected. Then, the position of the golf ball 10 is determined (estimated) from the two intersection points of the selected combination. This is because intersection points of the distance circles C1 through C3 close to the golf ball 10 are considered to concentrate in an area somewhat close to the golf ball 10 even when the accuracy of the GPS positioning part 232 and the distance determining part 234 is low. Furthermore, while the golf ball 10 is located from the distance circles C1 through C3 corresponding to three Points P1 through P3 in the case illustrated in FIG. 2, the golf ball 10 may also be located based on one or more intersection points of four or more distance circles corresponding to four or more points. This makes it possible to increase the accuracy of the measurement of the position of the golf ball 10 using four or more distance circles when, for example, three distance circles do not exactly intersect at one point.

Next, a flow of a process of locating the golf ball 10 ("position determining process") executed by the mobile terminal 20 (the ball search application) according to this embodiment is described with reference to FIG. 3.

Figure 3:
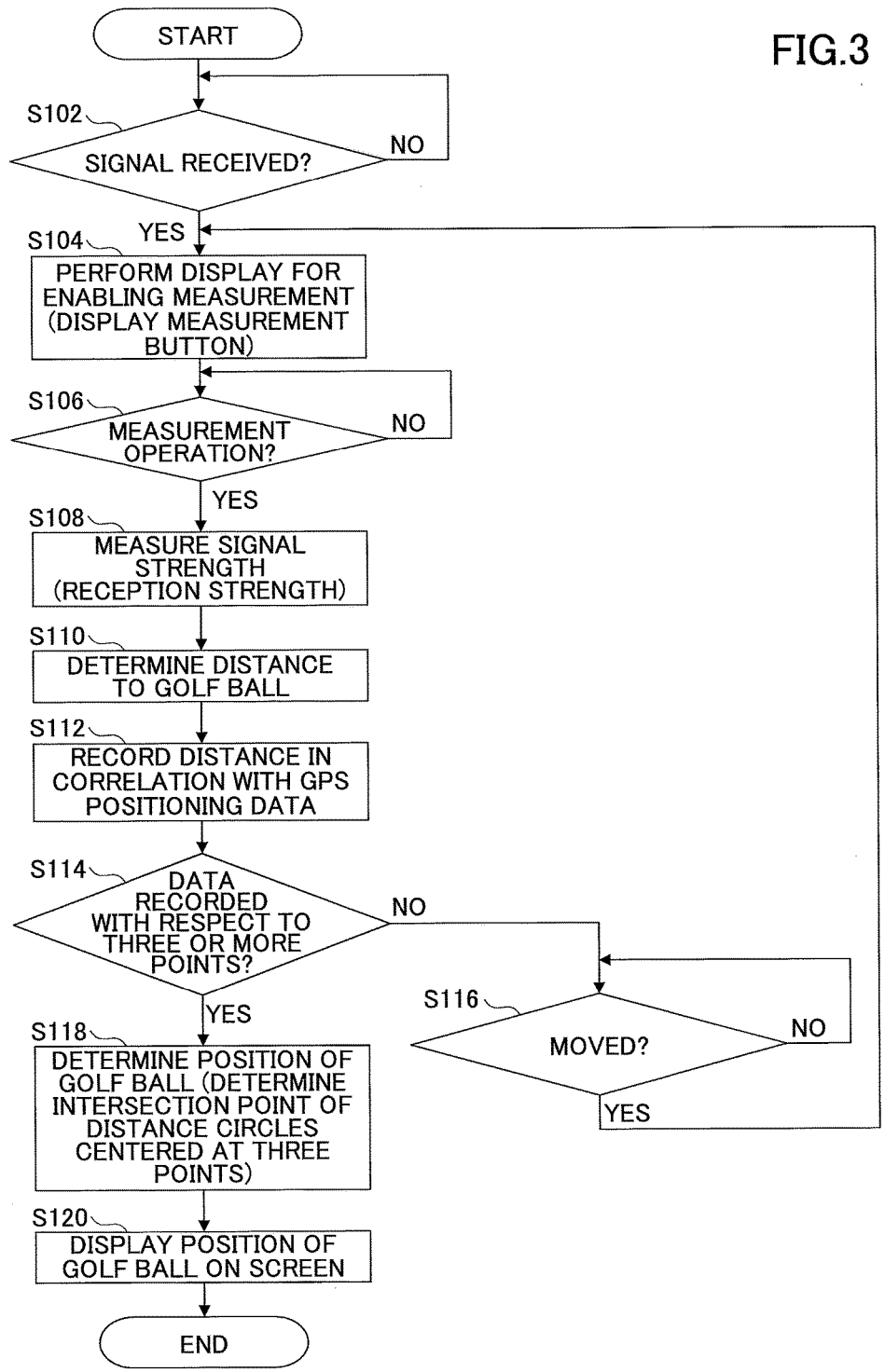
FIG. 3 is a flowchart schematically illustrating a position determining process executed by the mobile terminal according to the first embodiment.

FIG. 3 is a flowchart schematically illustrating a position determining process executed by the mobile terminal 20 according to this embodiment. The process of this flowchart is started in response to the activation of the ball search application, for example.

At step S102, the position determining part 235 determines whether a radio signal from the golf ball 10 is received by the communications processing part 231. This is because the mobile terminal 20 may be outside the maximum range of a radio signal transmitted from the golf ball 10. If a radio signal from the golf ball 10 is received by the communications processing part 231 (YES at step S102), the position determining part 235 proceeds to step S104. If no radio signal from the golf ball 10 is received by the communications processing part 231 (NO at step S102), the position determining part 235 repeats the process of step S102.

At step S104, the display processing part 236 displays a measurement button for measuring the reception strength of the radio signal from the golf ball 10 on the display 24 in response to a request from the ball search application.

At step S106, the position determining part 235 determines whether there is an operation on the measurement button (such as a touch operation on the measurement button on the display 24). In response to determining that there is an operation on the measurement button (YES at step S106), the position determining part 235 proceeds to step S108. In response to determining that there is no operation on the measurement button (NO at step S106), the position determining part 235 repeats the process of step S106.

At step S108, the reception strength measuring part 233 measures the reception strength of the radio signal received from the golf ball 10.

At step S110, the distance determining part 234 determines the distance from the mobile terminal 20 to the golf ball 10 based on the reception strength of the radio signal measured by the reception strength measuring part 233.

At step S112, the position determining part 235 records the determined distance from the mobile terminal 20 to the golf ball 10 in the storage part 239 in correlation with GPS positioning data (the position of the mobile terminal 20)

determined by the GPS positioning part 232 at the time of reception of the radio signal whose reception strength is measured at step S108.

At step S114, the position determining part 235 determines whether the data are recorded in the storage part 239 with respect to three or more points. In response to determining that the data are recorded with respect to three or more points (YES at step S114), the position determining part 235 proceeds to step S118. In response to determining that the data are not recorded with respect to three or more points (NO at step S114), the position determining part 235 proceeds to step S116.

At step S116, the position determining part 235 determines, based on the result of a position measurement by the GPS positioning part 232, whether the mobile terminal 20 has moved since the time of reception of the radio signal whose reception strength is measured at step S108. In response to determining that the mobile terminal 20 has moved (YES at step S116), the position determining part 235 returns to step S104 to repeat the process of steps S104 through S114. In response to determining that the mobile terminal 20 has not moved (NO at step S116), the position determining part 235 repeats the process of step S116.

At step S118, the position determining part 235 determines the position of the golf ball 10 based on the GPS positioning data (namely, the position of the mobile terminal 20) at each of the three points and the distance from the mobile terminal 20 to the golf ball 10 at each of the three points recorded in the storage part 239. That is, the position determining part 235 determines the distance from the mobile terminal 20 to the golf ball 10 based on one or more intersection points of three distance circles corresponding to the three points as described above.

At step S120, in response to a request from the ball search application, the display processing part 236 displays information on the position of the golf ball 10 on the display 24 to allow a user to recognize the position of the golf ball 10. Therefore, even when it becomes impossible to visually recognize the golf ball 10 during a round of golf, it is possible to find the golf ball 10.

The information on the position of the golf ball 10 may be displayed in any manner. For example, the display processing part 236 may display, based on the result of a position measurement by the GPS positioning part 232, the direction and distance of the golf ball 10 with reference to the current position of the mobile terminal 20. Alternatively, when displaying information on the position of the golf ball 10, the display processing part 236 may superimpose the position of the golf ball 10 over an image of the course layout of a current hole on the display 24 based on a database correlating the course layout of each hole of a golf course with corresponding position information (hereinafter simply referred to as "course database"), stored in, for example, the secondary storage 23c of the processing device 23, and the result of a position measurement by the GPS positioning part 232.

Thus, according to this embodiment, the position determining part 235 measures the position of the golf ball 10 based on the strength of a radio signal received from the golf ball 10 by the communications processing part 231 at three or more points that differ from one another in the position of the mobile terminal 20 measured by the GPS positioning part 232. Specifically, the position determining part 235 measures the position of the golf ball 10 based on the distance from the mobile terminal 20 to the golf ball 10 determined by the distance determining part 234 at each of three or more points and the position of the mobile terminal 20 measured by the GPS positioning part 232 at each of the three or more points. As a result, as described above, it is possible to measure the position of the golf ball 10 based on one or more intersection points of three distance circles each having a center at the mobile terminal 20 at one of the three or more points. Furthermore, the golf ball 10 includes a built-in radio communications device (such as a Bluetooth communications module) less expensive than, for example, a GPS receiver. Therefore, it is possible to locate a golf ball with a relatively low-cost arrangement.

Second Embodiment

Next, a second embodiment is described.

A positioning system 2 according to this embodiment is different from the positioning system 1 of the first embodiment in that the mobile terminal 20 includes a travel direction specifying part 237. In the following description, the same elements as those of the first embodiment are referred to using the same reference numerals, and basically, differences from the first embodiment are described.

Figure 4:
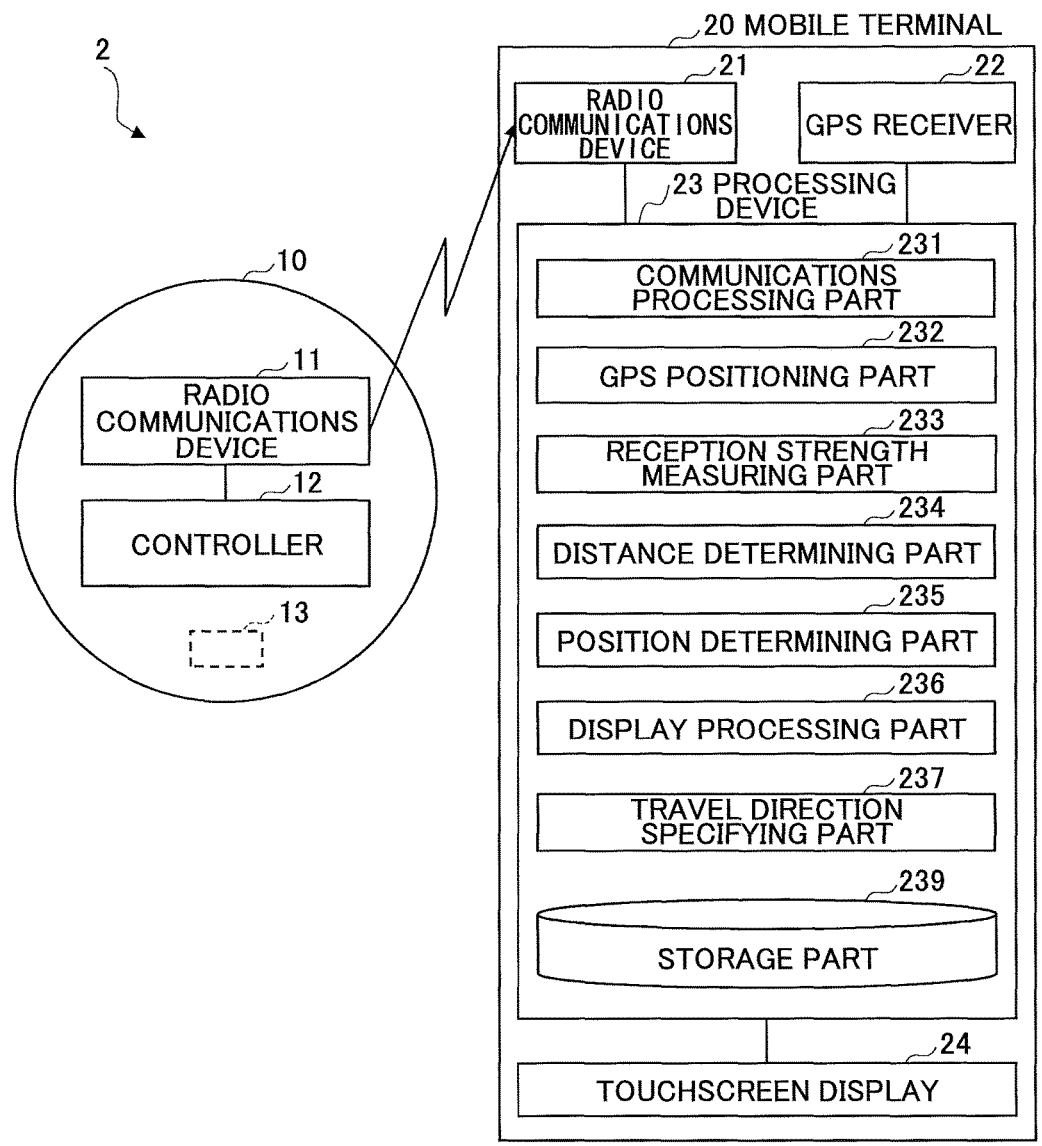
FIG. 4 is a block diagram depicting a schematic arrangement of a positioning system according to a second embodiment.

FIG. 4 is a schematic block diagram depicting an arrangement of the positioning system 2 according to this embodiment.

In addition to the communications processing part 231, the GPS positioning part 232, the reception strength measuring part 233, the distance determining part 234, the position determining part 235, the display processing part 236, and the storage part 239, the processing device 23 includes the travel direction specifying part 237.

The travel direction specifying part 237 specifies the travel direction of the golf ball 10. For example, the travel direction specifying part 237 may extract data on the golf course being played from the course database stored in, for example, the secondary storage 23c of the processing device 23, and determine a direction toward a green as the travel direction of the golf ball 10 based on the extracted data and the result of a position measurement by the GPS positioning part 232. Alternatively, the travel direction specifying part 237 may specify the travel direction of the golf ball 10 based on the history of the results of position measurements by the GPS positioning part 232 within a predetermined time (for example, 10 minutes), namely, the history of movements of a user in a hole being played.

According to this embodiment, the function of the travel direction specifying part 237, as well as the functions of the reception strength measuring part 233, the distance determining part 234, and the position determining part 235, is called by or incorporated into the ball search application.

Next, a technique of locating the golf ball 10 by the positioning system 2 (the position determining part 235) according to this embodiment is described with reference to FIG. 5.

Figure 5:
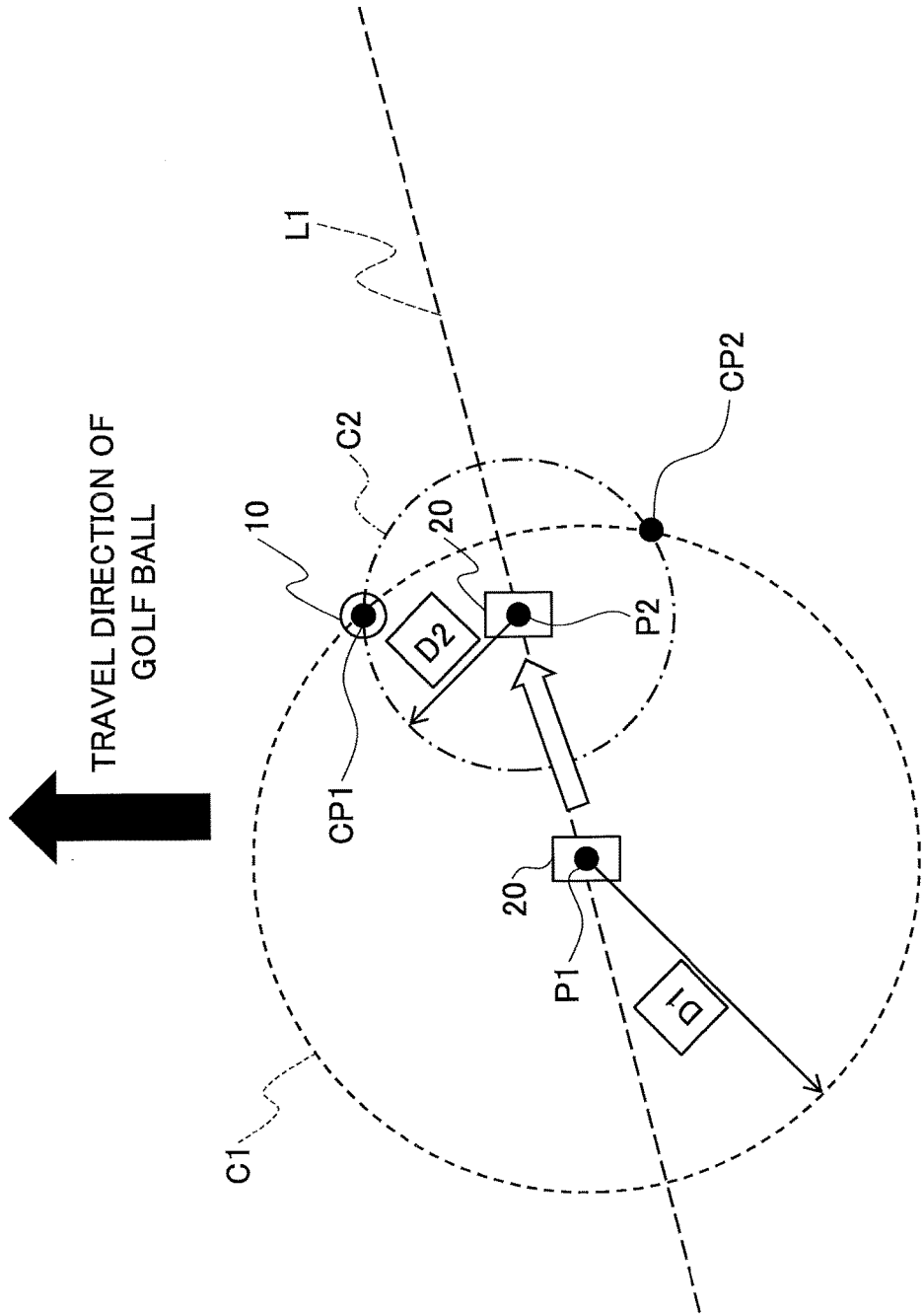
FIG. 5 is a diagram illustrating a technique of locating a golf ball by the positioning system according to the second embodiment.

FIG. 5 is a diagram illustrating a technique of locating the golf ball 10 by the positioning system 2 (the position determining part 235). In the following description, it is assumed that a user moves from Point P1 to Point P2 to search for the golf ball 10.

In the case illustrated in FIG. 5, unlike in the first embodiment (FIG. 2), the golf ball 10 is located based on the intersection points of the two distance circles C1 and C2 corresponding to different Points P1 and P2, respectively.

As depicted in FIG. 5, normally, the intersection points of the two distance circles C1 and C2 are often found at two points (Intersection Points CP1 and CP2). Therefore, in the illustrated case, the position determining part 235 selects an intersection point corresponding to the golf ball 10 from Intersection Points CP1 and CP2 based on the travel direction of the golf ball 10 (indicated by the black arrow in FIG. 5). Specifically, with reference to a boundary line L1 connecting Point P1 (namely, the position of the mobile terminal 20 measured by the GPS positioning part 232 at Point P1) and Point P2 (namely, the position of the mobile terminal 20 measured by the GPS positioning part 232 at Point P2), the intersection point in an area ahead in the travel direction of the golf ball 10 is presumed to be the position of the golf ball 10. In this case, Intersection Point CP1 is in an area ahead in the travel direction of the golf ball 10 with reference to the boundary line L1 compared with Intersection Point CP2. Therefore, Intersection Point CP1 may be determined (presumed) to be the position of the golf ball 10.

Next, a flow of a position determining process executed by the mobile terminal 20 (the ball search application) according to this embodiment is described with reference to FIG. 6.

Figure 6:
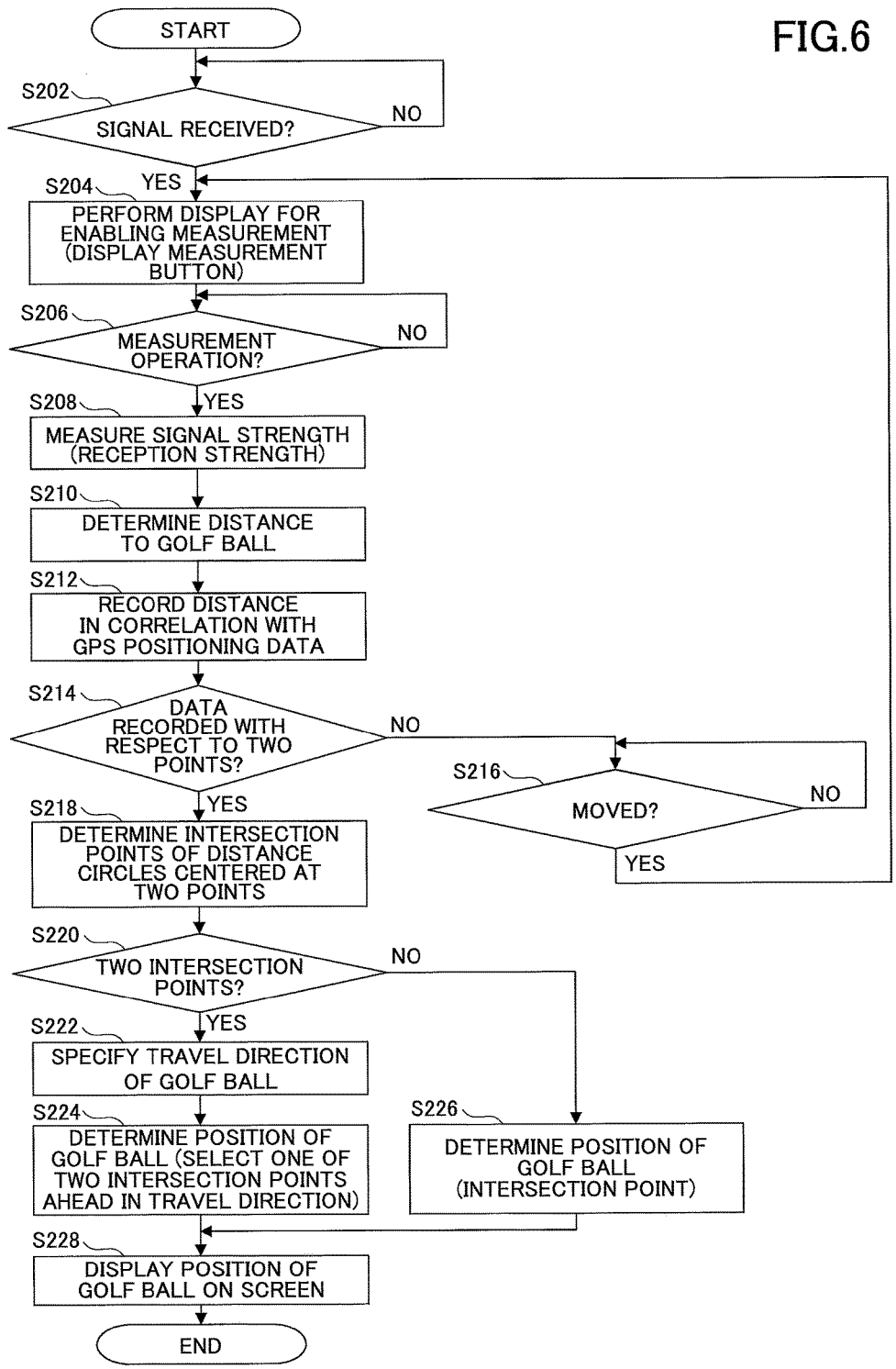
FIG. 6 is a flowchart schematically illustrating a position determining process executed by the mobile terminal according to the second embodiment.

FIG. 6 is a flowchart schematically illustrating a position determining process executed by the mobile terminal 20 according to this embodiment. The process of this flowchart is started in response to the activation of the ball search application, for example.

A description of the process of steps S202 through S212, which is the same as the process of steps S102 through S112 of the first embodiment (FIG. 3), is omitted.

At step S214, the position determining part 235 determines whether the data are recorded in the storage part 239 with respect to two points. In response to determining that the data are recorded in the storage part 239 with respect to two points (YES at step S214), the position determining part 235 proceeds to step S218. In response to determining that the data are not recorded with respect to two points (NO at step S214), the position determining part 235 proceeds to step S216.

At step S216, the position determining part 235 determines, based on the result of a position measurement by the GPS positioning part 232, whether the mobile terminal 20 has moved since the time of reception of the radio signal whose reception strength is measured at step S208. In response to determining that the mobile terminal 20 has moved (YES at step S216), the position determining part 235 returns to step S204 to repeat the process of steps S204 through S214. In response to determining that the mobile terminal 20 has not moved (NO at step S216), the position determining part 235 repeats the process of step S216.

At step S218, the position determining part 235 identifies one or more intersection points of two distance circles centered at respective two points.

At step S220, the position determining part 235 determines whether two intersection points are identified. In response to determining that two intersection points are identified (YES at step S220), the position determining part 235 proceeds to step S222. In response to determining that two intersection points are not identified (the two distance circles touch each other at a single point) (NO at step S220), the position determining part 235 proceeds to step S226.

Even when there are two intersection points, the position determining part 235 may determine that the two distance circles touch each other at a single point if the distance between the two intersection points is somewhat small (smaller than a predefined threshold).

At step S222, the travel direction specifying part 237 specifies the travel direction of the golf ball 10.

At step S224, the position determining part 235 selects one of the two identified intersection points which one is in an area ahead in the travel direction of the golf ball 10 with reference to the position of the mobile terminal 20 measured by the GPS positioning part 232 at each of the two points, and specifies the selected one of the intersection points as the position of the golf ball 10 as described above.

At step S226, the position determining part 235 determines the single intersection point (point of contact) as the position of the golf ball 10.

In the case of determining at step S220 that the number of identified intersection points is one although there are two intersection points as described above, the position determining part 235 may determine, for example, the middle point of the two intersection points as the position of the golf ball 10.

At step S228, in response to a request from the ball search application, the display processing part 236 displays information on the position of the golf ball 10 on the display 24 to allow a user to recognize the position of the golf ball 10.

Thus, according to this embodiment, the position determining part 235 measures the position of the golf ball 10 based on the strength of a radio signal received from the golf ball 10 by the communications processing part 231 at two points that differ from one another in the position of the mobile terminal 20 measured by the GPS positioning part 232. Specifically, when two distance circles corresponding to the two points intersect at multiple (two) points, the position determining part 235 presumes that one of the intersection points which one is ahead of the other in the travel direction of the golf ball 10 specified by the travel direction specifying part 237 with reference to the position of the mobile terminal 20 measured by the GPS positioning part 232 at each of the two points is the position of the golf ball 10. Thus, the reception strength of a radio signal from the golf ball 10 may be measured (that is, the distance from the mobile terminal 20 to the golf ball 10 may be determined) solely at two points. Therefore, it is possible to efficiently locate the golf ball 10 while keeping accuracy.

According to this embodiment, when two distance circles corresponding to two different points intersect at two points, one of the intersection points is determined as the position of the golf ball 10. Alternatively, however, both intersection points may be displayed on the display 24 as possible positions of the golf ball 10. This makes it possible to reduce an operational load on the position determining part 235 to reduce the battery consumption of the mobile terminal 20. Furthermore, because the travel direction of the golf ball 10 can be determined by a user, the user can determine which intersection point corresponds to the actual position of the golf ball 10 by taking the travel direction of the golf ball 10 into consideration.

Third Embodiment

Next, a third embodiment is described.

A positioning system 3 according to this embodiment is different from the positioning system 1 of the first embodiment in that the golf ball 10 is located using multiple mobile terminals 20, which are denoted by reference numerals 20A, 20B, and 20C in the following description. Furthermore, in the following description, the same elements as those of the first embodiment are referred to using the same reference numerals, and basically, differences from the first embodiment are described.

Figure 7:
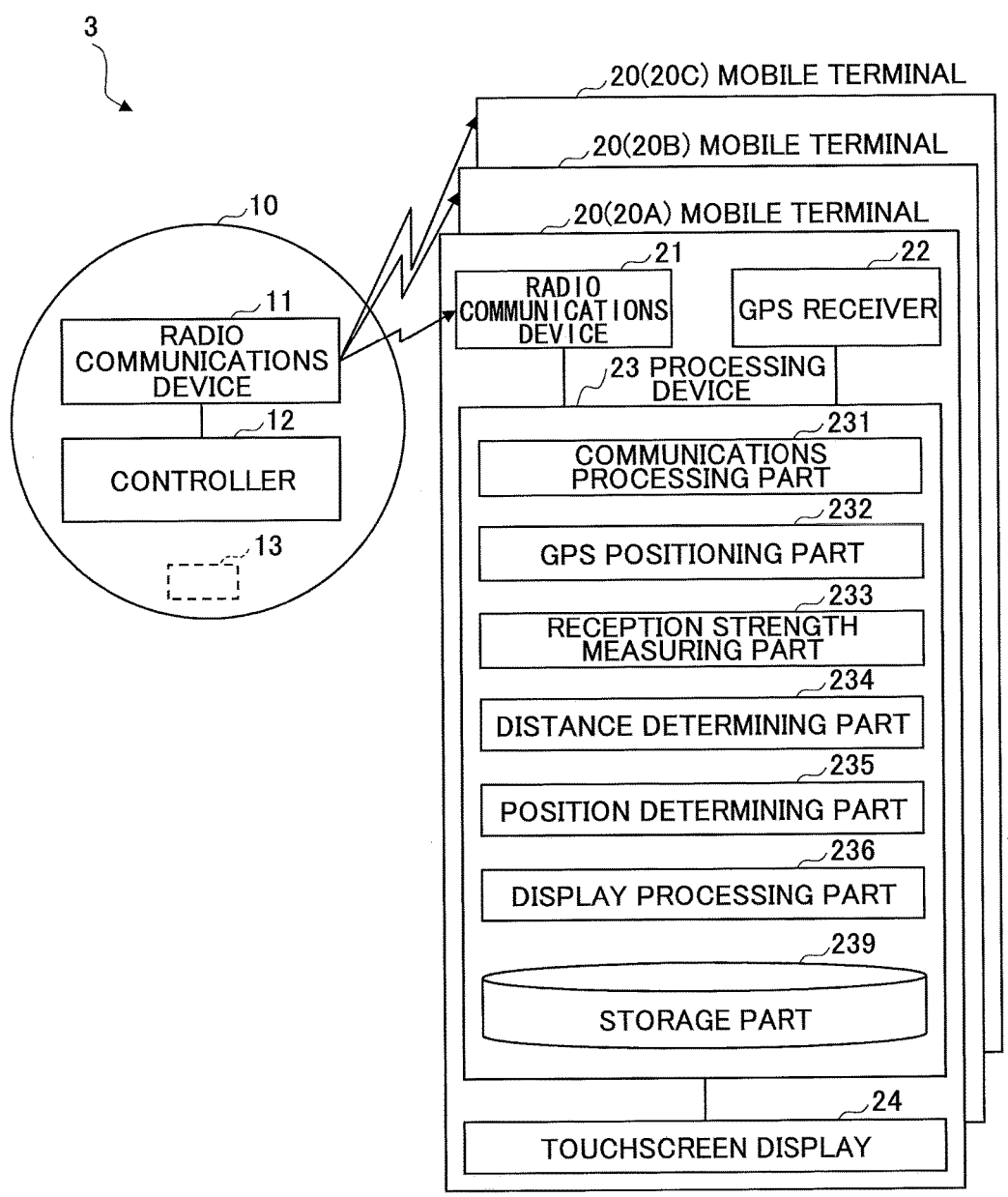
FIG. 7 is a block diagram depicting a schematic arrangement of a positioning system according to a third embodiment.

FIG. 7 is a schematic block diagram depicting an arrangement of the positioning system 3 according to this embodiment. In the following description, it is assumed that the radio communications device 11 and the radio communications device 21 (each of which is a Bluetooth communications module) have a multipoint function (the function of enabling simultaneous connections with multiple paired Bluetooth devices) according to this embodiment.

According to this embodiment, as described above, the golf ball 10 is located using the three mobile terminals 20A through 20C. The mobile terminals 20A through 20C are portable terminals, such as cellular phones, smartphones, or tablet terminals, carried by players (users) who play a round together. A description of the arrangement of each of the mobile terminals 20A through 20C, which is the same as the arrangement of the mobile terminal 20 of the first embodiment, is omitted.

It is assumed that (the radio communications devices 21 of) the mobile terminals 20A through 20C are paired with one another in advance and that (the radio communications devices 21 of) the mobile terminals 20A through 20C and (the radio communications device 11) of the golf ball 10 are also paired in advance.

Next, a technique of locating the golf ball 10 by the positioning system 3 (the position determining part 235) according to this embodiment is described with reference to FIG. 8.

Figure 8:
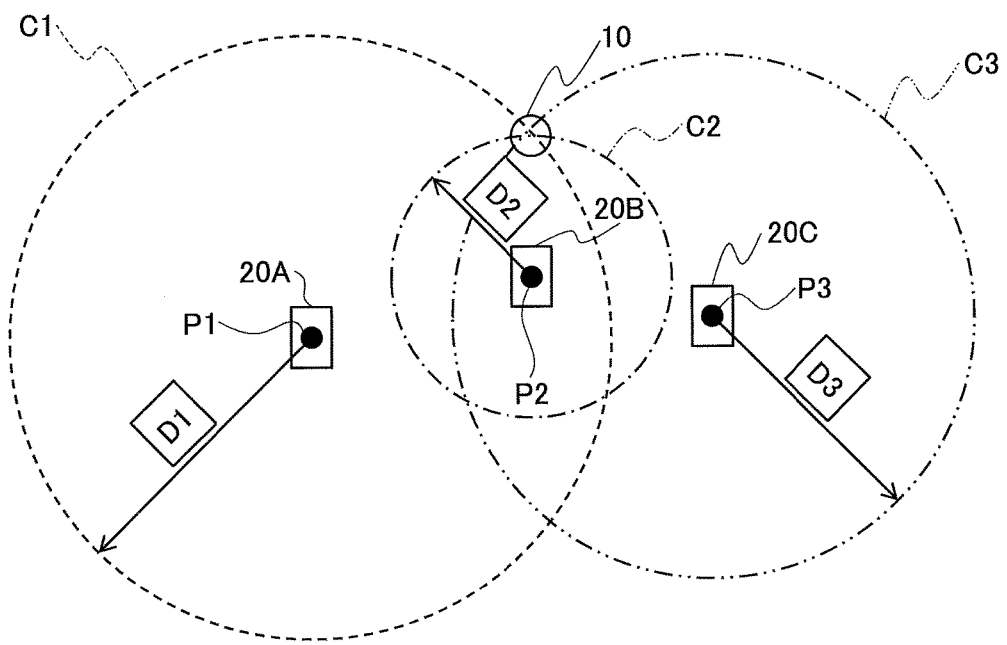
FIG. 8 is a diagram illustrating a technique of locating a golf ball by the positioning system according to the third embodiment.

FIG. 8 is a diagram illustrating a technique of locating the golf ball 10 by the positioning system 3 (the position determining part 235).

Referring to FIG. 8, a user carrying the mobile terminal 20A is at Point P1. At Point P1, the mobile terminal 20A (the GPS positioning part 232) measures the position of the mobile terminal 20A, and the mobile terminal 20A (the distance determining part 234) determines the distance from the mobile terminal 20A to the golf ball 10 (the distance=the value D1).

Furthermore, a user carrying the mobile terminal 20B is at Point P2. At Point P2, the mobile terminal 20B (the GPS positioning part 232) measures the position of the mobile terminal 20B, and the mobile terminal 20B (the distance determining part 234) determines the distance from the mobile terminal 20B to the golf ball 10 (the distance=the value D2).

In addition, a user carrying the mobile terminal 20C is at Point P3. At Point P3, the mobile terminal 20C (the GPS positioning part 232) measures the position of the mobile terminal 20C, and the mobile terminal 20C (the distance determining part 234) determines the distance from the mobile terminal 20C to the golf ball 10 (the distance=the value D3).

That is, the mobile terminals 20A through 20C obtain GPS positioning data (device position information) and information on the distance from the device (mobile terminal 20A, 20B or 20C) to the golf ball 10 (distance information) at different Points P1 through P3, respectively. Therefore, by collecting and processing the device position information and the distance information obtained by the mobile terminals 20A through 20C at Points P1 through P3 in one of the mobile terminals 20A through 20C, it is possible to locate the golf ball 10 in the same manner as in the first embodiment (FIG. 2). In the following description, among the mobile terminals 20A through 20C, a mobile terminal that determines the position of the golf ball 10 is referred to as "master terminal," and a mobile terminal that obtains device position information and distance information and transmits the obtained information to the master terminal is referred to as "slave terminal."

While the three mobile terminals 20A through 20C are employed according to this embodiment, four or more mobile terminals 20 may also be employed. As noted above, this makes it possible to locate the golf ball 10 based on the intersection points of four or more distance circles corresponding to four or more points and to increase the accuracy of the measurement of the position of the golf ball 10 using the four or more distance circles when, for example, three distance circles do not exactly intersect at one point. Furthermore, this embodiment, which is illustrated as employing the three mobile terminals 20A through 20C, may also be implemented using two mobile terminals 20. In this case, it is possible to locate the golf ball 10 using the technique illustrated in the second embodiment (FIG. 5). Furthermore, while one of the mobile terminals 20A through 20C (master terminal) alone locates the golf ball 10 according to this embodiment, the golf ball 10 may be located by two or more mobile terminals 20.

Next, a flow of a position determining process executed by the master terminal (the ball search application) according to this embodiment is described with reference to FIG. 9.

Figure 9:
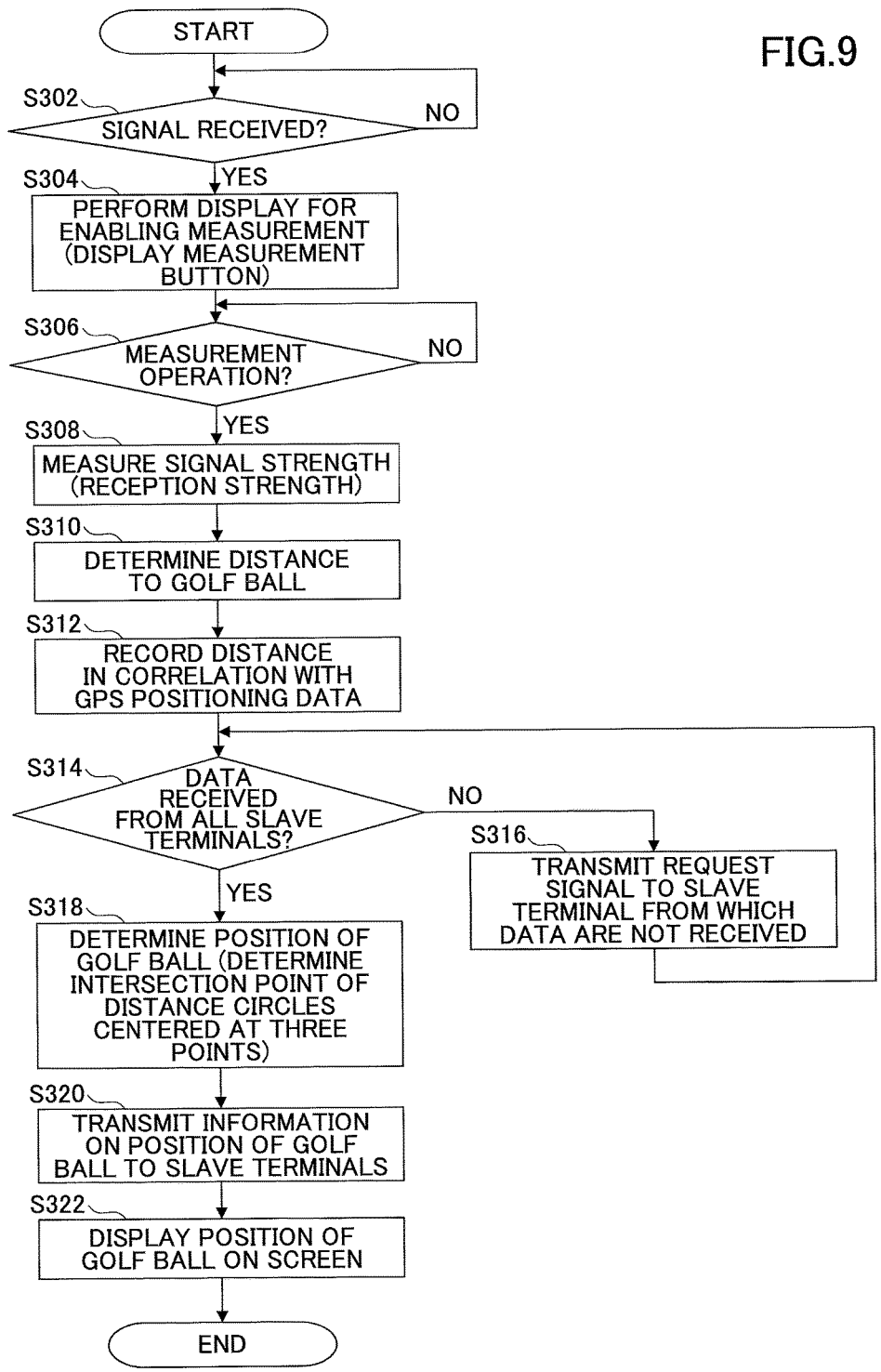
FIG. 9 is a flowchart schematically illustrating a position determining process executed by the mobile terminal (master terminal) according to the third embodiment.

FIG. 9 is a flowchart schematically illustrating a position determining process executed by the master terminal according to this embodiment. The process of this flowchart is started in response to the activation of the ball search application, for example. In the following description, it is assumed that a slave terminal automatically transmits the above-described device position information and distance information to the master terminal in response to obtaining the device position information and the distance information.

A description of the process of steps S302 through S312, which is the same as the process of steps S102 through S112 of the first embodiment (FIG. 3), is omitted.

At step S314, the position determining part 235 determines whether data (device position information and distance information) are received from all slave terminals by the communications processing part 231. In response to determining that data are received from all slave terminals by the communications processing part 231 (YES at step S314), the position determining part 235 proceeds to step S318. In response to determining that data are not received from at least one of the slave terminals by the communications processing part 231 (NO at step S18), the position determining part 235 proceeds to step S316.

At step S316, the communications processing part 231 transmits a request signal to a slave terminal from which data are not received. As a result, for example, a message urging a measurement of reception strength is displayed on the display 24 of the slave terminal that receives the request signal. Then, the process returns to step S314 to repeat the process of step S314.

At step S318, the position determining part 235 determines the position of the golf ball 10 based on one or more intersection points of three distance circles corresponding to three points.

At step S320, the communications processing part 231 transmits information on the position of the golf ball 10 determined by the position determining part 235 to the slave terminals. This makes it possible to display the position of the golf ball 10 on the displays 24 of the slave terminals as well.

At step S322, in response to a request from the ball search application, the display processing part 236 displays information on the position of the golf ball 10 on the display 24 to allow a user of the master terminal to recognize the position of the golf ball 10.

Thus, according to this embodiment, the golf ball 10 is located using multiple mobile terminals 20 (the mobile terminals 20A through 20C). Specifically, a slave terminal transmits information on the position of the slave terminal measured by the GPS positioning part 232 of the slave terminal (device position information) and information on the distance from the slave terminal to the golf ball 10 measured by the distance determining part 234 of the slave terminal (distance information) to a master terminal. Then, the position determining part 235 of the master terminal measures the position of the golf ball 10 based on the position of the master terminal measured by the GPS positioning part 232 of the master terminal, the distance from the master terminal to the golf ball 10 determined by the distance determining part 234 of the master terminal, and the device position information and the distance information received from the slave terminals. This reduces a user's operations and processing required in each mobile terminal 20, thus making it possible to efficiently locate the golf ball 10. Furthermore, normally, it is often the case that multiple players play a round of golf together. According to this embodiment, it is possible to use such a characteristic of golf to increase users' convenience.

Fourth Embodiment

Next, a fourth embodiment is described.

A positioning system 4 according to this embodiment is different from the positioning system 1 of the first embodiment in that the golf ball 10 is located using multiple mobile terminals 20, which are denoted by reference numerals 20D and 20E in the following description, and that of the mobile terminals 20D and 20E, the mobile terminal 20E is attached to a golf cart 30. In the following description, the same elements as those of the first embodiment are referred to using the same reference numerals, and basically, differences from the first embodiment are described.

Figure 10:
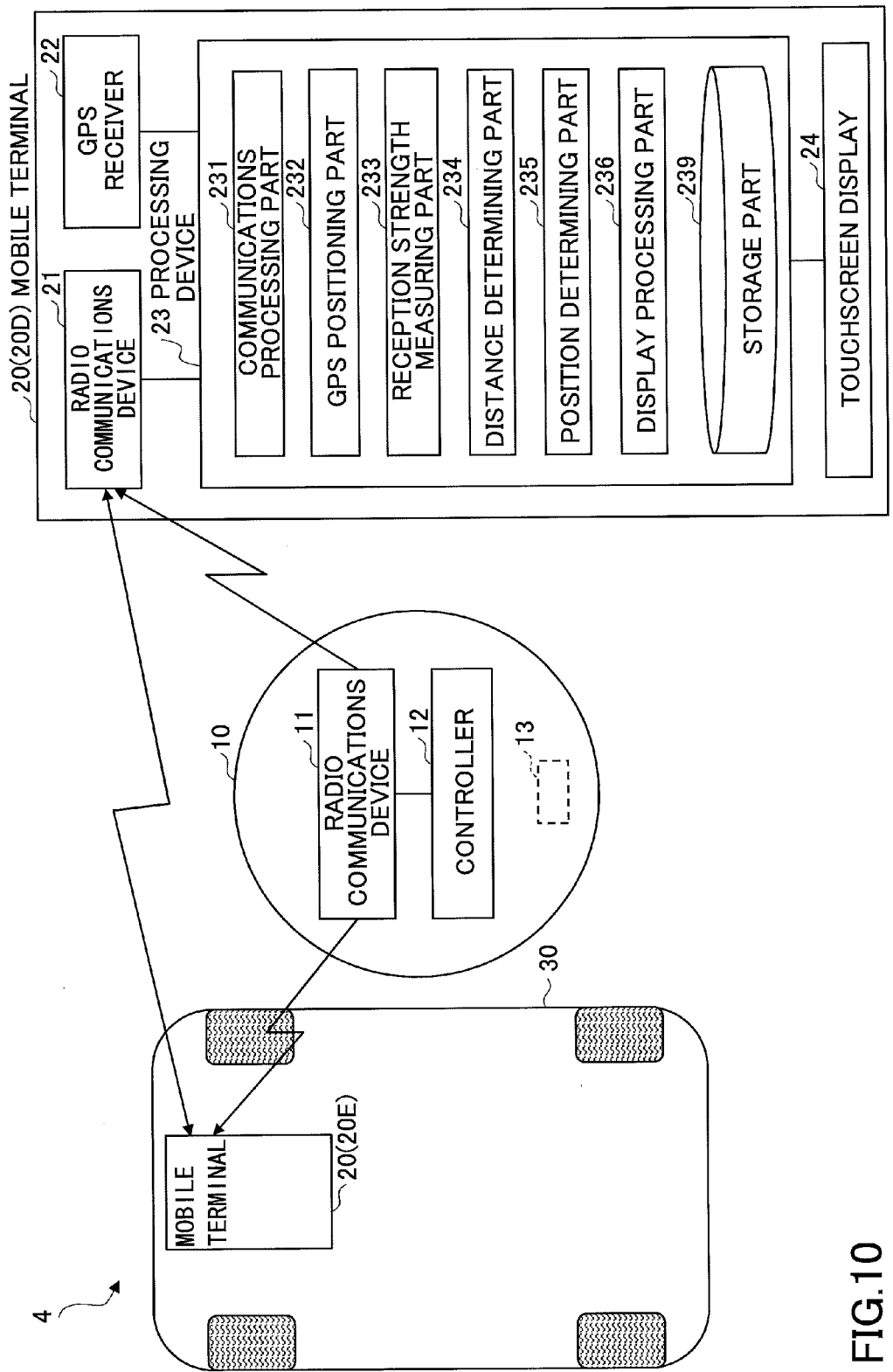
FIG. 10 is a block diagram depicting a schematic arrangement of a positioning system according to a fourth embodiment.

FIG. 10 is a schematic block diagram depicting an arrangement of the positioning system 4 according to this embodiment. In the following description, it is assumed that the radio communications device 11 and the radio communications device 21 (each of which is a Bluetooth communications module) have a multipoint function according to this embodiment.

As described above, according to this embodiment, the two mobile terminals 20D and 20E are used to locate the golf ball 10.

The mobile terminal 20D is a portable terminal, such as a cellular phone, a smartphone, or a tablet terminal, carried by a player (user) who plays a round of golf.

The mobile terminal 20E is attached to the golf cart 30 that the user drives or rides on to move during a round of golf as described above. A description of the arrangement of each of the mobile terminals 20D and 20E, which is the same as the arrangement of the mobile terminal 20 of the first embodiment, is omitted.

It is assumed that (the radio communications devices 21 of) the mobile terminals 20D and 20E are paired with each other in advance and that (the radio communications devices 21 of) the mobile terminals 20D and 20E and (the radio communications device 11) of the golf ball 10 are also paired in advance.

Next, a technique of locating the golf ball 10 by the positioning system 4 (the position determining part 235) according to this embodiment is described with reference to FIG. 11.

Figure 11:
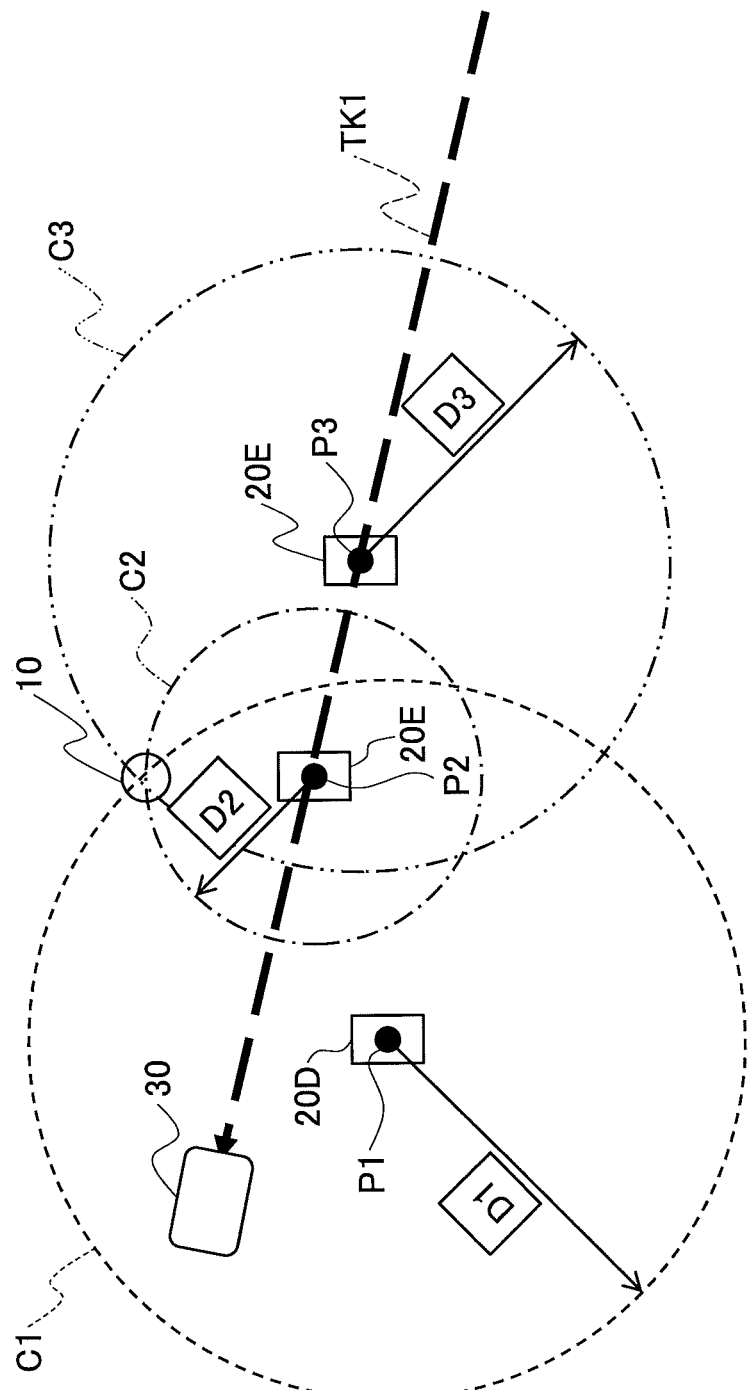
FIG. 11 is a diagram illustrating a technique of locating a golf ball by the positioning system according to the fourth embodiment.

FIG. 11 is a diagram illustrating a technique of locating the golf ball 10 by the positioning system 4 (the position determining part 235).

Referring to FIG. 11, a user carrying the mobile terminal 20D is at Point P1. At Point P1, the mobile terminal 20D (the GPS positioning part 232) measures the position of the mobile terminal 20D, and the mobile terminal 20D (the distance determining part 234) determines the distance from the mobile terminal 20D to the golf ball 10 (the distance=the value D1).

Furthermore, the golf cart 30, to which the mobile terminal 20E is attached, carries the user carrying the mobile terminal 20D and travels in a track TK1 that passes through Points P1 and P2 to the vicinity of Point P1, where the golf cart 30 is stopped. The mobile terminal 20E (its GPS positioning part 232 and distance determining part 234), for example, during its move, periodically measures the position of the mobile terminal 20E and determines the distance from the mobile terminal 20E to the golf ball 10. The mobile terminal 20E can determine whether the mobile terminal 20E is moving based on the results of measurements by the GPS positioning part 232.

In the case illustrated in FIG. 11, the mobile terminal 20E (its GPS positioning part 232 and distance determining part 234) measures the position of the mobile terminal 20E and determines the distance from the mobile terminal 20E to the golf ball 10 at each of Points P2 and P3 on the track of the golf cart 30. That is, during the move of the golf cart 30, at Point P2, the mobile terminal 20E (the GPS positioning part 232) measures the position of the mobile terminal 20E, and the mobile terminal 20E (the distance determining part 234) determines the distance from the mobile terminal 20E to the golf ball 10 (the distance=the value D2). Furthermore, during the move of the golf cart 30, at Point P3, the mobile terminal 20E (the GPS positioning part 232) measures the position of the mobile terminal 20E, and the mobile terminal 20E (the distance determining part 234) determines the distance from the mobile terminal 20E to the golf ball 10 (the distance=the value D3).

Accordingly, by collecting and processing the device position information and the distance information obtained by the mobile terminal 20D at Point P1 and the device position information and the distance information obtained by the mobile terminal 20E at each of Points P2 and P3 in one of the mobile terminals 20D and 20E, it is possible to locate the golf ball 10 in the same manner as in the first embodiment (FIG. 2). In the following description, it is assumed that (the position determining part 235 of) the mobile terminal 20D determines the position of the golf ball 10.

The data obtained at a point or points different from Points P1 through P3 by at least one of the mobile terminals 20D and 20E may be further used to locate the golf ball 10 based on intersection points of four or more distance circles corresponding to four or more points. This makes it possible to increase the accuracy of the measurement of the position of the golf ball 10 using the four or more distance circles when, for example, three distance circles do not exactly intersect at one point. Furthermore, the data obtained at two points by at least one of the mobile terminals 20D and 20E may be used to locate the golf ball 10, using the technique described in the second embodiment (FIG. 5). Furthermore, the data obtained at two or more points obtained by the mobile terminal 20E attached to the golf cart 30 alone may be used to locate the golf ball 10. Furthermore, while the single mobile terminal 20D alone locates the golf ball 10 according to this embodiment, the golf ball 10 may alternatively be located by the mobile terminal 20E alone or by both mobile terminals 20D and 20E.

Next, a flow of a position determining process executed by the mobile terminal 20D (the ball search application) according to this embodiment is described with reference to FIG. 12.

Figure 12:
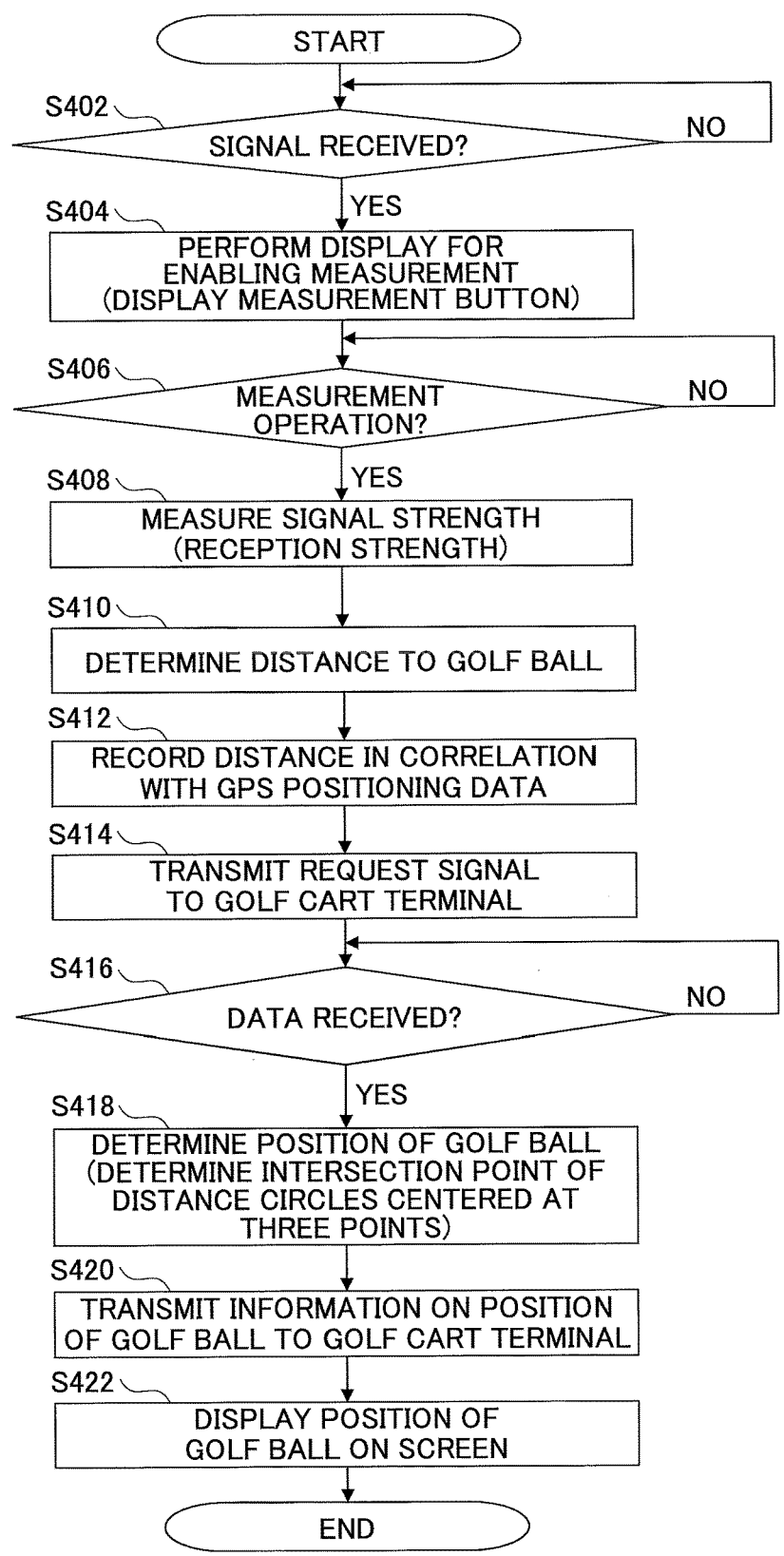
FIG. 12 is a flowchart schematically illustrating a position determining process executed by the mobile terminal according to the fourth embodiment.

FIG. 12 is a flowchart schematically illustrating a position determining process executed by the mobile terminal 20D according to this embodiment. The process of this flowchart is started in response to the activation of the ball search application, for example.

A description of the process of steps S402 through S412, which is the same as the process of steps S102 through S112 of the first embodiment (FIG. 3), is omitted.

At step S414, the communications processing part 231 transmits a request signal that requests transmission of data (device position information and distance information) to the mobile terminal 20E attached to the golf cart 30. In response to the request signal, (the communications processing part 231 of) the mobile terminal 20E transmits the data to the mobile terminal 20D.

At step S416, the position determining part 235 determines whether the data are received from the mobile terminal 20E by the communications processing part 231. In response to determining that the data are received from the mobile terminal 20E by the communications processing part 231 (YES at step S416), the position determining part 235 proceeds to step S418. In response to determining that the data are not received from the mobile terminal 20E by the communications processing part 231 (NO at step S416), the position determining part 235 repeats the process of step S416.

At step S418, the position determining part 235 determines the position of the golf ball 10 based on one or more intersections of three distance circles corresponding to three points.

At step S420, the communications processing part 231 transmits information on the position of the golf ball 10 determined by the position determining part 235 to the mobile terminal 20E. This makes it possible to display the position of the golf ball 10 on the display 24 of the mobile terminal 20E attached to the golf cart 30 as well.

At step S422, in response to a request from the ball search application, the display processing part 236 displays information on the position of the golf ball 10 on the display 24 to allow a user to recognize the position of the golf ball 10.

Thus, according to this embodiment, the golf ball 10 is located using the mobile terminal 20D carried by a user and the mobile terminal 20E attached to the golf cart 30. Specifically, the mobile terminal 20E transmits information on the position of the mobile terminal 20E measured by the GPS positioning part 232 of the mobile terminal 20E (device position information) and information on the distance from the mobile terminal 20E to the golf ball 10 measured by the distance determining part 234 of the mobile terminal 20E (distance information) to the mobile terminal 20D. Then, the position determining part 235 of the mobile terminal 20D measures the position of the golf ball 10 based on the position of the mobile terminal 20D measured by the GPS positioning part 232 of the mobile terminal 20D, the distance from the mobile terminal 20D to the golf ball 10 determined by the distance determining part 234 of the mobile terminal 20D, and the device position information and the distance information received from the mobile terminal 20E. This reduces the user's operations and processing required in the mobile terminal 20D, thus making it possible to efficiently locate the golf ball 10. Furthermore, it is often the case that the golf cart 30 is used during a round of golf. According to this embodiment, using such a characteristic of golf, the mobile terminal 20E attached to the golf cart 30 automatically obtains data during the move of the golf cart 30, thus increasing users' convenience.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

For example, according to the above-described embodiments, based on the reception strength of a radio signal received from the golf ball 10, measured by the reception strength measuring part 233, the distance determining part 234 determines the distance from the mobile terminal 20 to the golf ball 10, and then the position determining part 235 locates the golf ball 10. The present invention, however, is not limited to this configuration. That is, because the relationship between the reception strength and the distance may be defined on a one-to-one basis, the position of the golf ball 10 may be determined without determining the distance by preparing a calculation formula or a calculation map that determines the position from the reception strength of a radio signal from the golf ball 10 measured at two or more different points.

What is claimed is:

1. A positioning system, comprising:
a golf ball including
a battery; and
a transmitter configured to operate with electric power supplied from the battery and transmit a radio signal to outside of the golf ball; and
a mobile terminal including
a receiver configured to receive the radio signal from the golf ball; and
a processor configured to measure a position of the mobile terminal, and to measure a position of the golf ball based on strength of the radio signal received by the receiver at two or more points at which the measured position of the mobile terminal differs,
wherein the processor of the mobile terminal is configured to determine a distance from the mobile terminal to the golf ball based on the strength of the radio signal received by the receiver, and to measure the position of the golf ball based on the distance from the mobile terminal to the golf ball determined at each of the two or more points and the position of the mobile terminal measured at each of the two or more points, and
wherein the processor of the mobile terminal is configured to measure the position of the golf ball based on at least one intersection point of a first circle and a second circle, the first circle being centered at the position of the mobile terminal measured at a first point included in the two or more points, and having a radius that is the distance from the mobile terminal to the golf ball determined at the first point, the second circle being centered at the position of the mobile terminal measured at a second point included in the two or more points and different from the first point, and having a radius that is the distance from the mobile terminal to the golf ball determined at the second point.

2. The positioning system as claimed in claim 1, wherein the processor of the mobile terminal is configured to specify a travel direction of the golf ball, and to presume, when there are a plurality of intersection points of the first circle and the second circle, that one of the plurality of intersection points that is ahead in the specified travel direction of the mobile terminal with reference to the position of the mobile terminal measured at each of the first point and the second point is the position of the golf ball.

3. The positioning system as claimed in claim 1, wherein the processor of the mobile terminal is configured to measure the position of the golf ball based on at least one intersection point of the first circle, the second circle, and a third circle, the third circle being centered at the position of the mobile terminal measured at a third point included in the two or more points and different from the first point and the second point, and having a radius that is the distance from the mobile terminal to the golf ball determined at the third point.

4. The positioning system as claimed in claim 1, wherein the mobile terminal includes a first mobile terminal carried by a user and a second mobile terminal attached to a golf cart, the first mobile terminal including a first receiver configured to receive the radio signal from the golf ball, and a first processor configured to measure a position of the first mobile terminal and to determine a distance from the first mobile terminal to the golf ball based on the strength of the radio signal received by the first receiver, the second mobile terminal including a second receiver configured to receive the radio signal from the golf ball, and a second processor configured to measure a position of the second mobile terminal and to determine a distance from the second mobile terminal to the golf ball based on the strength of the radio signal received by the second receiver, the second mobile terminal further includes a transmitter configured to transmit information on the distance from the second mobile terminal to the golf ball determined by the second processor of the second mobile terminal, the first receiver of the first mobile terminal is further configured to receive the information on the distance transmitted from the second mobile terminal, and the first processor of the first mobile terminal is configured to measure the position of the golf ball based on the distance from the first mobile terminal to the golf ball determined by the first processor of the first mobile terminal and the information on the distance received by the first receiver of the first mobile terminal.

5. The positioning system as claimed in claim 1, wherein the mobile terminal includes a first mobile terminal carried by a first user and a second mobile terminal carried by a second user, the first mobile terminal including a first receiver configured to receive the radio signal from the golf ball, and a first processor configured to measure a position of the first mobile terminal and to determine a distance from the first mobile terminal to the golf ball based on the strength of the radio signal received by the first receiver, the second mobile terminal including a second receiver configured to receive the radio signal from the golf ball, and a second processor configured to measure a position of the second mobile terminal and to determine a distance from the second mobile terminal to the golf ball based on the strength of the radio signal received by the second receiver, the second mobile terminal further includes a transmitter configured to transmit information on the distance from the second mobile terminal to the golf ball determined by the second processor of the second mobile terminal, the first receiver of the first mobile terminal is further configured to receive the information on the distance transmitted from the second mobile terminal, and the first processor of the first mobile terminal is configured to measure the position of the golf ball based on the distance from the first mobile terminal to the golf ball determined by the first processor of the first mobile terminal and the information on the distance received by the first receiver of the first mobile terminal.

6. A positioning method executed in a mobile terminal including a receiver configured to receive a radio signal from a golf ball and a processor, the golf ball including a battery and a transmitter configured to operate with electric power supplied from the battery and transmit the radio signal to outside of the golf ball, the positioning method comprising:

measuring, by the processor of the mobile terminal, a position of the mobile terminal;

measuring, by the processor of the mobile terminal, a position of the golf ball based on strength of the radio signal received by the receiver at two or more points at which the measured position of the mobile terminal differs, determining, by the processor of the mobile terminal, a distance from the mobile terminal to the golf ball based on the strength of the radio signal received by the receiver, and measuring the position of the golf ball based on the distance from the mobile terminal to the golf ball determined at each of the two or more points and the position of the mobile terminal measured at each of the two or more points, and measuring the position of the golf ball based on at least one intersection point of a first circle and a second circle, the first circle being centered at the position of the mobile terminal measured at a first point included in the two or more points, and having a radius that is the distance from the mobile terminal to the golf ball determined at the first point, the second circle being centered at the position of the mobile terminal measured at a second point included in the two or more points and different from the first point, and having a radius that is the distance from the mobile terminal to the golf ball determined at the second point.

7. A non-transitory computer-readable storage medium having stored therein a program for causing a computer to execute processes of the positioning method as set forth in claim 6.

8. The positioning system as claimed in claim 1, wherein the mobile terminal further includes a global positioning system receiver configured to receive a global positioning system signal, and the processor is further configured to measure the position of the mobile terminal based on the global positioning system signal.

* * * * *